(12) United States Patent
Shrum, Jr.

(10) Patent No.: US 8,787,165 B2
(45) Date of Patent: Jul. 22, 2014

(54) PARAMETERIZED QUALITY OF SERVICE FOR MULTIMEDIA IN A COAXIAL NETWORK

(75) Inventor: Edgar V. Shrum, Jr., Smyrna, GA (US)

(73) Assignee: Cox Communications, Inc., Atlanta, GA (US)

( * ) Notice: Subject to any disclaimer, the term of this patent is extended or adjusted under 35 U.S.C. 154(b) by 270 days.

(21) Appl. No.: 12/769,034

(22) Filed: Apr. 28, 2010

(65) Prior Publication Data

US 2011/0267945 A1 Nov. 3, 2011

(51) Int. Cl.
*H04L 12/56* (2006.01)
*H04J 3/22* (2006.01)
*H04L 12/26* (2006.01)

(52) U.S. Cl.
USPC ............... 370/232; 370/392.21; 370/468

(58) Field of Classification Search
None
See application file for complete search history.

(56) References Cited

U.S. PATENT DOCUMENTS

| | | | | |
|---|---|---|---|---|
| 2008/0192820 | A1* | 8/2008 | Brooks et al. | 375/240.02 |
| 2010/0214916 | A1* | 8/2010 | Wu et al. | 370/230 |
| 2011/0113455 | A1* | 5/2011 | Wu | 725/82 |
| 2011/0205891 | A1* | 8/2011 | Kliger et al. | 370/230 |

OTHER PUBLICATIONS

CableLabs®, Data-Over-Cable Service Interface Specifications: DOCSIS Set-top Gateway (DSG) Interface Specification: CM-SP-DSG-I14-090529, May 29, 2009, 141 pages.
CableLabs®, OpenCable™ Specifications: Out-of-Band Transfer Interface Specification: OC-SP-OOB-I01-051118, Nov. 18, 2005, 13 pages.
CableLabs®, OpenCable™ Application Platform Specifications: OCAP 1.1 Profile: OC-SP-OCAP1.1.2-090930, Sep. 30, 2009, 667 pages.
McCloghrie, et al., Structure of Management Information Version 2 (SMIv2), Apr. 1999, 43 pages.
Huston, Next Steps for the IP QoS Architecture, Nov. 2000, 25 pages.
Braden, Ed., et al., Resource ReSerVation Protocol (RSVP)—Version 1 Functional Specification, Sep. 1997, 113 pages.
Nichols, et al., Definition of the Differentiated Services Field (DS Field) in the IPv4 and IPv6 Headers, Dec. 1998, 21 pages.
International Telecommunication Union, ITU-T: Telecommunication Standardization Sector of ITU, Series X: Data Networks and Open System Communication: OSI networking an system aspects—Quality of Service, International Standard 13236; ITU-T Recommendation X.641, "Information technology—Quality of Service: Framework", Dec. 12, 1997, 57 pages.

* cited by examiner

*Primary Examiner* — Marcus R Smith
(74) *Attorney, Agent, or Firm* — Merchant & Gould (57) ABSTRACT

Parameterized Quality of Service (QoS) may be provided. In response to receiving a registration request from a device, a determination of resource availability may be made. If resources are available to satisfy data flows to the device, a flow priority may be established and the device may be added to the priority queue configuration. If the device later requests establishment of a data flow, the data flow may be transmitted at the established flow priority.

20 Claims, 6 Drawing Sheets

PARAMETERIZED QUALITY OF SERVICE FOR MULTIMEDIA IN A COAXIAL NETWORK

BACKGROUND

Parameterized quality of Service (QoS) is an electronically-implemented process for creating guaranteed QoS flows over content distribution equipment in a coaxial network. In some situations, content distribution requests can overwhelm a network's resources. For example, multiple set-top boxes (STBs) may each be receiving different, high definition video flows over a household coaxial network. This may tax the available bandwidth for the video distribution network and may result in disrupted viewing experiences for one and/or more of the users associated with the STBs. Conventional systems may use a priority-based QoS scheme, but this may result in each flow requesting the same "highest" priority status without offering a means to sort and/or analyze the requirements and capabilities of each content flow.

SUMMARY

Consistent with embodiments of the present invention, systems and methods are disclosed for providing parameterized quality of service (QoS). In response to receiving a registration request from a device, a determination of resource availability may be made. If resources are available to satisfy data flows to the device, a flow priority may be established and the device may be added to the priority queue configuration. If the device later requests establishment of a data flow, the data flow may be transmitted at the established flow priority.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

DETAILED DESCRIPTION

Embodiments of the present invention provide for a method of providing parameterized quality of service (QoS) flows. Consistent with embodiments of the invention, a content subscriber may use a Multimedia over Coax Alliance (MoCA) standards-compliant device to provide parameterized QoS flows to their premises. MoCA is a nonprofit corporation organized to develop and promote specifications for the transport of digital content over coaxial cable. MoCA standards provide for home networking on existing coaxial cable in the 1 GHz microwave band, using Orthogonal frequency-division multiplexing (OFDM) modulation. The coaxial cable may be used for data connections to televisions, set-top boxes, and other entertainment devices without the need for new connections. The technology underlying the MoCA standard provides the elements necessary to use this coaxial cable to distribute high-quality multimedia content and high-speed data, with throughput exceeding 100 Mbit/s.

In conventional MoCA-based implementations, prioritized QoS flows may be made available. Numerous other published standards and references may be used in defining QoS implementations, such as the ITU-T Recommendation X.641, IETF RFCs 2474, 2205, and 2990, and the UPnP QoS Architecture standard, each of which are hereby incorporated by reference in their entirety. Table 1, below, lists common QoS priorities.

TABLE 1

Quality of Service Priority Levels

| Priority Level | Traffic Type |
| --- | --- |
| 0 (lowest) | Best Effort |
| 1 | Background |
| 2 | Standard |
| 3 | Excellent Load |
| 4 | Controlled Load |
| 5 | Voice and Video |
| 6 | Layer 3 Network Control Reserved Traffic |
| 7 (highest) | Layer 2 Network Control Reserved Traffic |

A subscriber may have a master set-top box (STB) comprising a MoCA compliant chipset and a plurality of other data receivers (e.g., secondary STBs, computers, portable media players, etc). Each of these devices may comprise an OpenCable Application Platform (OCAP) standard operating system and/or application. When using prioritized QoS, the OCAP application may request a priority level for each traffic flow, but no admission control or resource reservation may be available to ensure that the requested priority level is available. Consistent with embodiments of the invention, OCAP APIs may be used to instead request parameterized QoS flows. The parameterized system may be based on an exchange of application requirements (e.g., bandwidth requirements, average and/or peak data rates, acceptable error rates, and/or delay constraints) with a network controller, such as the master STB, that may be used to provide resource reservation and/or admission control.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Figure 1:
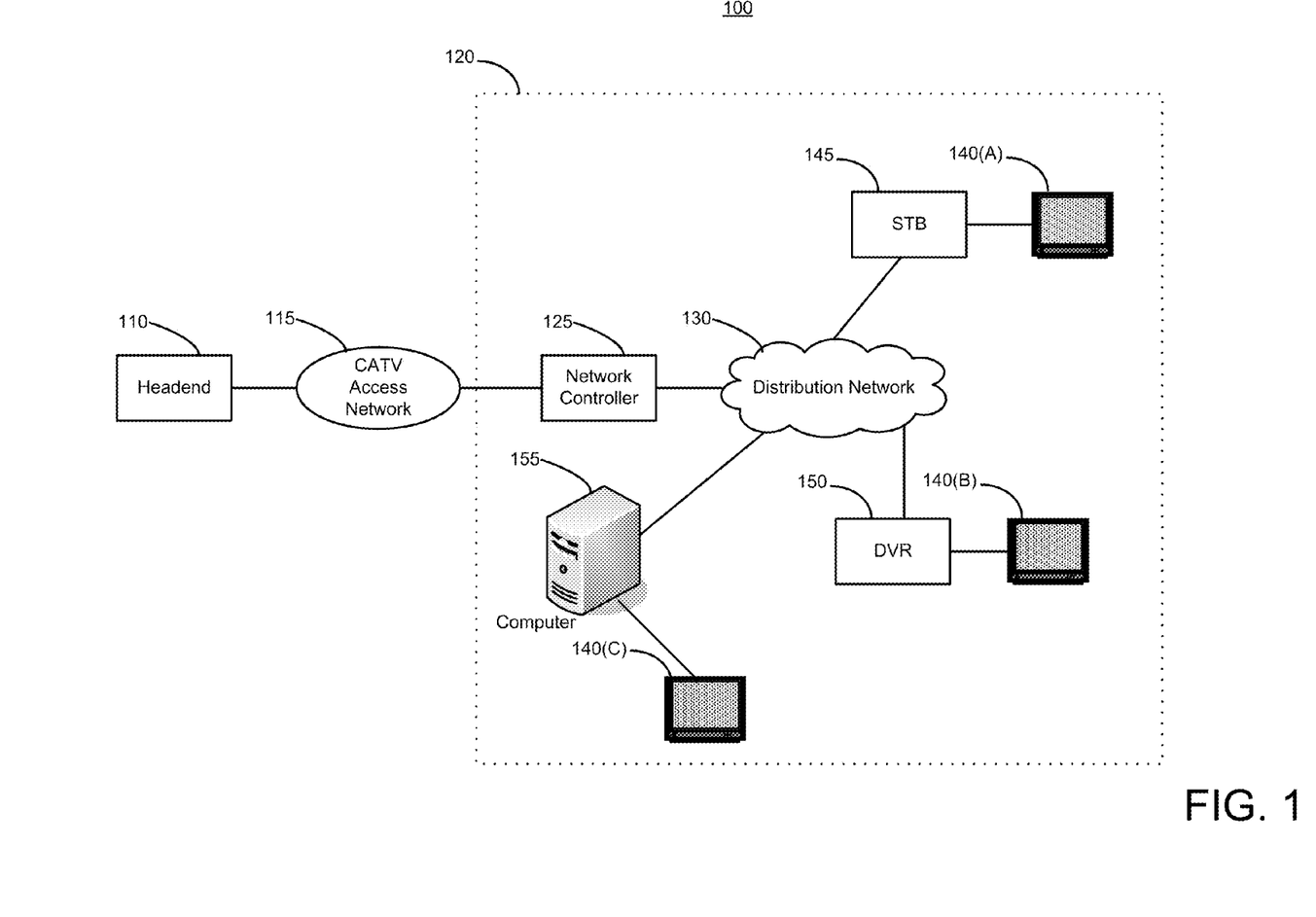
FIG. 1 is a block diagram illustrating an operating environment.

FIG. 1 is simplified block diagram illustrating an operating environment 100 for providing parameterized quality of service (QoS). Operating environment 100 may comprise a headed 110 associated with a cable television (CATV) service provider, a CATV access network 115, and a customer premises 120. Customer premises 120 may comprise a network controller 125, a distribution network 130, and a plurality of display devices 140(A)-140(C). Consistent with embodiments of the invention, display devices 140(A)-140(C) may connect to distribution network 130 via a set-top box (STB)

145, a digital video recorder (DVR) 150, and/or a computer 155. Each connection device may be operative for decoding data and/or content transmitted over distribution network 130 and/or a decoding device may be integrated into display devices 140(A)-140(C), such as with a cable card (not shown).

CATV access network 115 may comprise a public and/or a private network, such as a cable television distribution network (e.g., a hybrid fiber-coax network), a cellular data network, a metropolitan WiMAX network, and/or the Internet. Network controller 125 may be operative to request, receive, decode, encode, and/or remap program content received from the CATV service provider. Network controller 125 may further be operative to provide routing and/or admission functions for distribution network 130 and/or serve as a network gateway between distribution network 130 and CATV access network 115. Network controller 125 may also be operative to provide gateway and/or bridge functions between distribution network 130 and another data network, such as the Internet (not shown). Distribution network 130 may comprise a data network located within customer premises 120, such as a coaxial, Ethernet, and/or wireless data network. Display devices 140(A)-140(C) may comprise, for example, televisions, projectors, and/or other video output devices located within customer premises 120.

Figure 2:
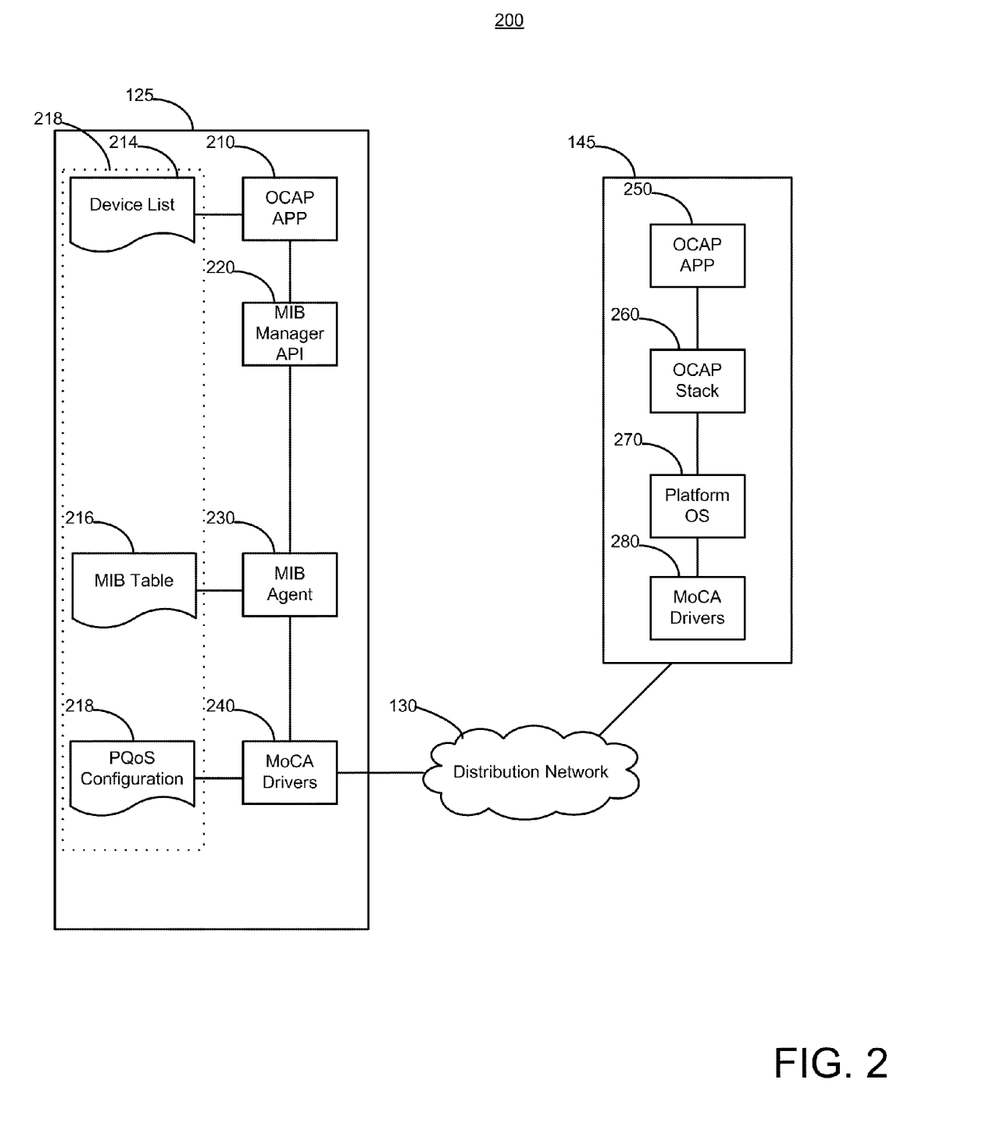
FIG. 2 is a block diagram illustrating components within a customer premises.

FIG. 2 is a block diagram 120 illustrating components within customer premises 120. Network controller 125 may be communicatively coupled to a decoding device, such as STB 145, over distribution network 130. Network controller 125 may comprise an OpenCable Application Platform (OCAP) application 210 and a memory 212 comprising a device list 214, a management information base (MIB) table 216, and a parameterized quality of service (PQoS) configuration table 218. Network controller 125 may further comprise a MIB manager API 220, a MIB agent 230, and a plurality of MoCA drivers 240 associated with a MoCA compatible chipset. STB 145 may comprise a client OCAP application 250, an operating system 270, and a plurality of MoCA compliant client drivers 280.

A management information base (MIB) may be used in a network management model and may comprise a collection of objects in a database that may be used for managing the devices in a communications network. Objects in MIB table 216 may be defined using Abstract Syntax Notation One (ASN.1) as defined in RFC 2578, which is hereby incorporated by reference in its entirety. Communications between network controller 125 and STB 145 may utilize the simple network management protocol (SNMP). SNMP is a communication protocol between a management station, such as network controller 125, and managed objects (MIB objects), such as routers, gateways, switches, STB 145, DVR 150, and/or computer 155. Network controller 125 may use MIB agent 230 to process SNMP based communications from other components. MIB manager API 220 may provide a software interface for exchanging information between MIB agent 230 and OCAP application 210.

Figure 3:
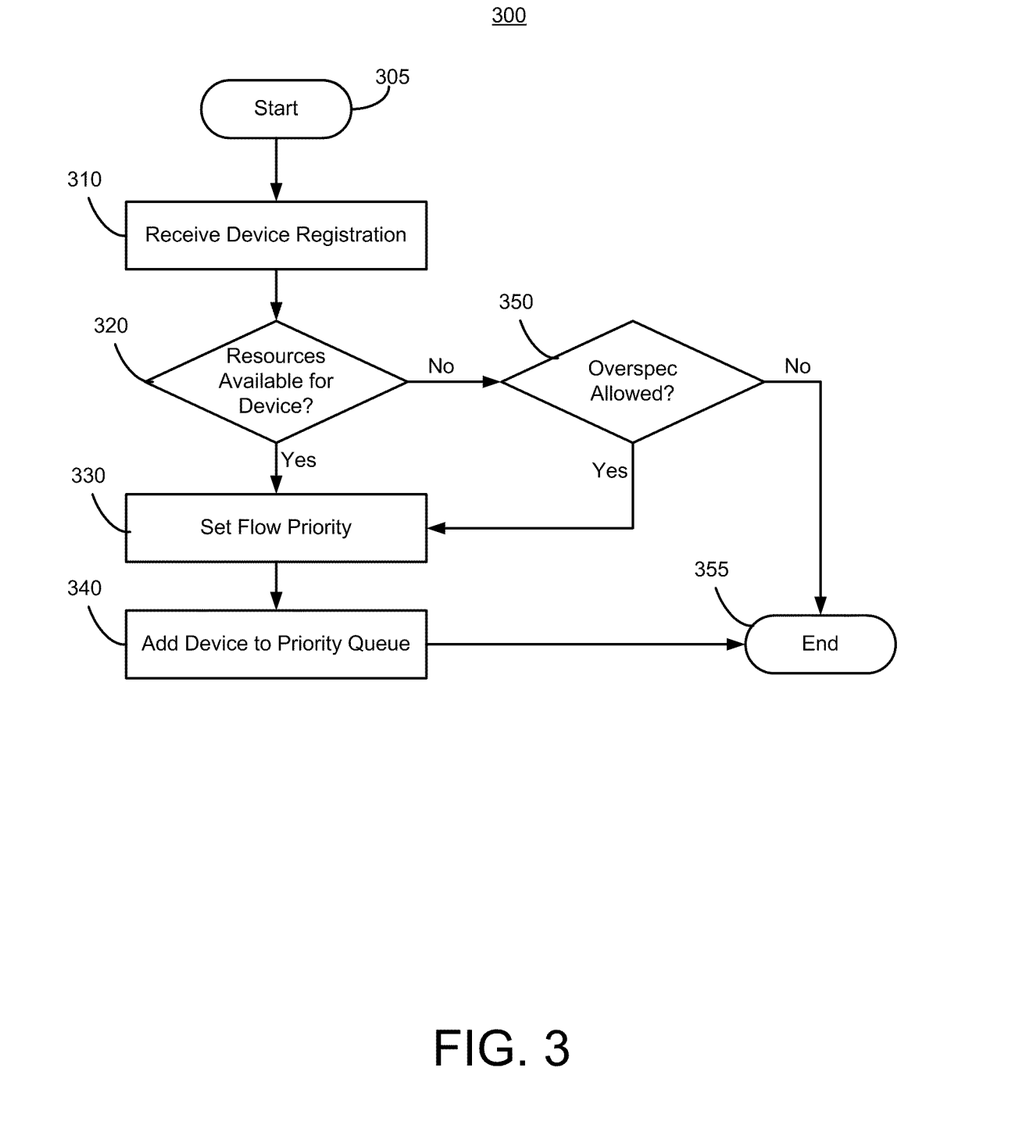
FIG. 3 is a flow chart showing an illustrative method for providing device registration.

FIG. 3 is a flow chart setting forth the general stages involved in method 300 consistent with embodiments of the invention for providing content placeholder markers. Method 300 may be implemented using computing device 600 as described in more detail below with respect to FIG. 6. Ways to implement the stages of method 300 will be described in greater detail below. Method 300 may begin at starting block 305 and proceed to stage 310 where computing device 600 may receive a device registration. For example, STB 145 may send a registration request to network controller 125 comprising parameters associated with the transmission of content flows such as a bandwidth, a nominal data rate, a peak data rate, a max burst size, a max packet size, a max delay, a max jitter/delay variation, and a max packet loss. The registration request may identify a source for the content flow and/or a destination for the content flow and may be sent by a source device and/or a destination device. The identification of the source and/or destination device may comprise a MAC address associated with the respective device(s). Devices may comprise, for example, STB 145, computer 155, a portable media player, digital video recorder 150, one of display devices 140(A)-(C), content servers associated with headend 110, and/or a cellular network device (e.g., a smartphone).

From stage 310, method 300 may advance to stage 320 where computing device 600 may determine whether sufficient resources are available to satisfy the parameters requested in the device registration. For example, OCAP application 210 on network controller 125 may refer to device list 214 to determine what resources have previously been requested for other devices using distribution network 130. Network controller 125 may further be operable to determine the maximum limits and/or capacity of distribution network 130 and/or have such capacity provisioned. For example, network controller 125 may allow a maximum of four high definition content flows between a content server at headend 110 and devices associated with distribution network 130. The determination of available resources may be made based on a priority associated with the registration request. For example, a priority request of level 5 may require greater resources to be available than a priority request of level 2.

If, at stage 320, computing device 600 determines that resources are available for the requested registration, method 300 may advance to stage 330 where computing device 600 may set a flow priority for the requested content flow. The priority may comprise a priority associated with the registration request and/or a highest available priority as determined by network controller 125. If the registration is proceeding in accordance with an overspecification configuration from stage 350, as described below, the priority may be set at a lower level than that associated with the request.

Method 300 may then advance to stage 340 where computing device 600 may add the device to a priority queue configuration. For example, network controller 125 may add the parameters and device identifiers (e.g., MAC addresses) to device list 214 for reference when a content flow associated with those devices is established. Method 300 may then end at stage 375.

If, at stage 320, the needed resources are determined not to be available at stage 320, method 300 may advance to stage 350 where computing device 600 may determine whether overspecification is allowed. For example, network controller 125 may be configured to register more devices than may be simultaneously supported by distribution network 130. The amount of overspecification may be configured differently for different premises based on a number of predicted or expected simultaneous content flows. For example, a commercial environment such as a hotel may comprise a lower margin of overspecification with the expectation that more devices will be in use simultaneously while a home environment may allow a greater degree of overspecification due to lower expected simultaneous demand. If overspecification is allowed, method 300 may advance to stage 330, as described above. Otherwise, the registration may be refused and method 300 may end at stage 355.

Figure 4:
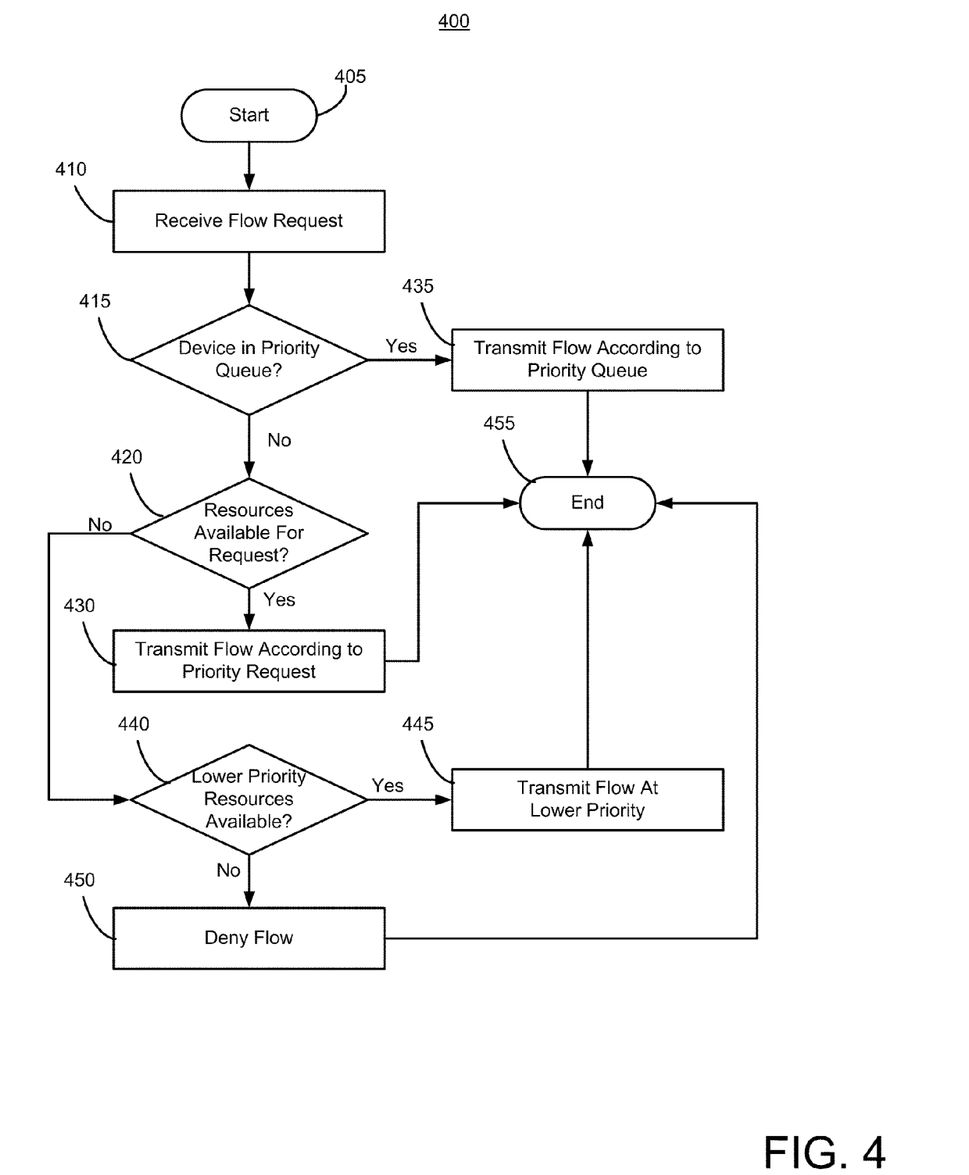
FIG. 4 is a flow chart showing an illustrative method for providing parameterized Quality of Service flows.

FIG. 4 is a flow chart setting forth the general stages involved in method 400 consistent with embodiments of the invention for providing content placeholder markers. Method 400 may be implemented using computing device 600 as described in more detail below with respect to FIG. 6. Ways to implement the stages of method 400 will be described in greater detail below. Method 400 may begin at starting block 405 and proceed to stage 410 where computing device 600 receive a flow request. For example, network controller 125 may receive a request to establish a content flow from a content server associated with headend 110 to STB 145.

Method 400 may then advance to stage 415 where computing device 600 may determine whether an entry in a priority queue configuration is associated with the flow request. For example, network controller 125 may look for an entry in device list 214 associated with a source MAC address and/or a destination MAC address.

If the entry is found in the priority queue configuration at stage 415, method 400 may advance to stage 435 where computing device 600 may establish the content flow according to the priority and/or traffic specification parameters associated with the entry in the priority queue configuration. Method 400 may then end at stage 455.

If no entry is found in the priority queue configuration at stage 415, method 400 may advance to stage 420 where computing device 600 may determine whether network resources are available to transmit the content flow. This may be accomplished as described above with respect to stage 320 of method 300.

If, at stage 420, computing device 600 determines that resources are available to establish the flow, method 400 may advance to stage 430 where computing device 600 may establish the content flow according to the priority associated with the request. For example, network controller 125 may establish a traffic flow from a content server at headend 110 to STB 145 at a requested QoS priority of 6. Further the traffic flow may be established according to other parameters associated with the request, such as a nominal data rate. Method 400 may then end at stage 455.

If, at stage 420, computing device 600 determines that resources are not available for the request, method 400 may advance to stage 440 where computing device 600 may determine whether resources are available to establish the flow at a lower QoS priority. For example, network controller 125 may determine that the flow may be established at a "best effort" priority (QoS level 0).

If the resources are available for the lower priority flow, method 400 may advance to stage 445 where computing device 600 may establish the content flow according to the lower priority. Otherwise, method 400 may advance to stage 450 where computing device 600 may deny establishment of the content flow. After establishing the flow at stage 445 or denying the establishment of the flow at stage 450, method 400 may end at stage 455.

Consistent with embodiments of the invention, method 300 and method 400 may be used in conjunction or separately to provide parameterized quality of service. The registration of method 300 may be performed on an ad-hoc basis each time a device attempts to establish a content flow, or devices may register once with the network controller and use the same priority each time a content flow is initiated. These registrations may be updated if the device's requested parameters change, a new content type becomes available, and/or network capacity changes.

Figure 5:
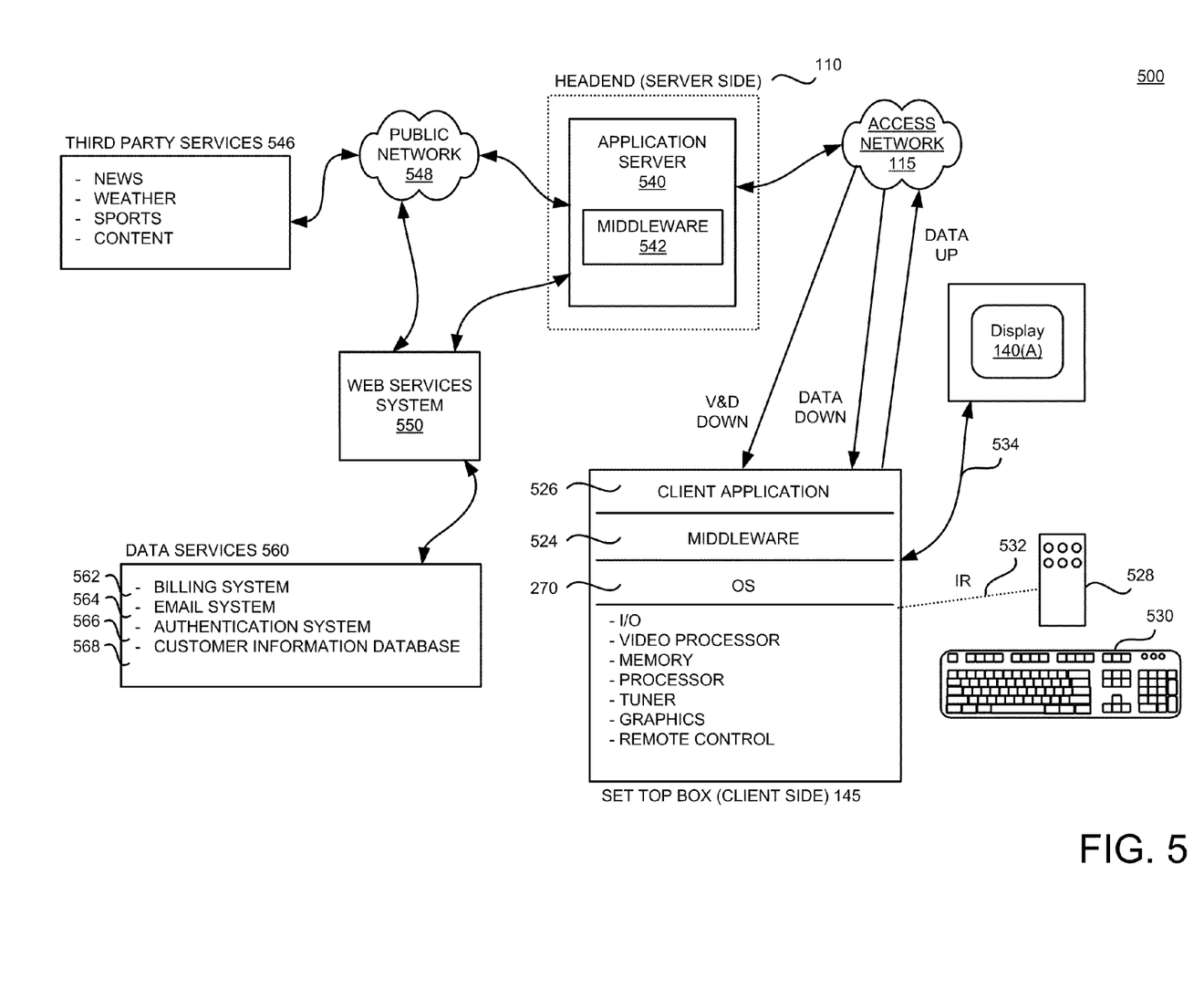
FIG. 5 is a block diagram of a cable television system.

FIG. 5 is a block diagram of a cable television (CATV) system 500 for providing digital and/or analog video programming, information content and interactive television services. These services may be transmitted via access network 115, such as a hybrid fiber coax (HFC) network, to a display device 140(A) for consumption by a cable television/services system customer. For example, display device 140(A) may be located at customer premises 200. Access network 115 may combine both optical fiber and coaxial cable lines. Typically, optical fiber runs from a cable headend 110 to neighborhoods of 500 to 2,000 customers. Coaxial cable runs from the optical fiber feeders to each customer. According to embodiments of the present invention, the functionality of access network 115 allows for efficient bidirectional data flow between a client-side set-top box 145 and a server-side application server 540 of the present invention. Set-top box 145 may comprise a terminal device such as terminal device 155 and/or terminal devices 225(A)-225(C).

CATV system 500 may comprise a distributed client-server computing system for providing video and data flow across access network 115 between server-side services providers (e.g., cable television/services providers) via headend 110 and a client-side customer via client-side set-top box 145 functionally connected to a customer receiving device, such as display device 140(A). CATV system 500 may provide a variety of services across access network 115 including traditional digital and analog video programming, telephone services, high speed Internet access, video-on-demand, and information services.

On the client side of CATV system 500, digital and analog video programming and digital and analog data may be provided to display device 140(A) via set-top box 145. Interactive television services that allow a customer to input data to CATV system 500 may likewise be provided by STB 145. As illustrated in FIG. 5, STB 145 may comprise a multipurpose computing device having a computer processor, memory and an input/output mechanism. The input/output mechanism may receive input from server-side processes via access network 115 and from customers via input devices such as a remote control device 528 and a keyboard 530. Remote control device 528 and keyboard 530 may communicate with the STB 145 via a suitable communication transport such as an infrared connection 532. STB 145 may also include a video processor for processing and providing digital and analog video signaling to display device 140(A) via a cable communication transport 534. A multi-channel tuner may be provided for processing video and data to and from STB 145 and headend 110.

STB 145 may also include an operating system 522 for directing the functions of STB 145 in conjunction with a variety of client applications. For example, if a client application 525 requires a news flash from a third-party news source to be displayed on display device 140(A), operating system 270 may cause the graphics functionality and video processor of STB 145, for example, to output the news flash to display device 140(A) at the direction of client application 526 responsible for displaying news items.

Because a variety of different operating systems 270 may be utilized by a variety of different brands and types of set-top boxes, a middleware layer 524 may be provided to allow a given software application to be executed by a variety of different operating systems. According to an embodiment of the present invention, middleware layer 524 may include a set of application programming interfaces (API) that are exposed to client application 526 and operating system 270 that allow client application 526 to communicate with operating system 270 through common data calls understood via the API set. As described below, a corresponding middleware layer may be included on the server side of CATV system 500 for facilitating communication between server-side application server 540 and client-side STB 145. A middleware layer 542 of server-side application server 540 and middleware layer 524 of client-side STB 145 may format data passed between the client side and server side according to the Extensible Markup Language (XML). As should be appreciated, XML is only one example of data formatting, data passed between the client side and the server side may be formatted according to any other suitable formatting language or standard.

According to one embodiment, the set-top box 105 passes digital and analog video and data signaling to the television 120 via a one-way communication transport 134. STB 145 may pass digital and analog video and data signaling to the display device 140(A) via communication transport 534. According to an embodiment, bidirectional communication may be accomplished between the STB 105 and the television 120. For example, high-definition multimedia interface (HDMI) ports on the STB 105 and television 120 allow for bidirectional data communications between the devices. STB 145 may receive video and data from the server side of CATV system 500 via access network 115 through a video/data downlink and data via a data downlink. STB 145 may transmit data from the client side of CATV system 500 to the server side of CATV system 500 via access network 115 via one data uplink. The video/data downlink may comprise an "in band" downlink that allows for digital and analog video and data signaling from the server side of CATV system 500 through access network 115 to set-top box 145 for use by STB 145 and for distribution to display device 140(A). The "in band" signaling space may operate at a variety of frequencies. According to one embodiment, the "in band" signaling space may operate at a frequency between 54 and 1000 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 5, between access network 115 and set-top box 145 may comprise "out of band" data links. The "out of band" frequency range generally lies between zero and 54 megahertz. Data flow between client-side set-top box 145 and server-side application server 540 is typically passed through the "out of band" data links. Alternatively, an "in band" data carousel may be positioned in an "in band" channel into which a data feed may be processed from server-side application server 540 through access network 115 to client-side STB 145. Operation of data transport between components of CATV system 500, described with reference to FIG. 5, is well known to those skilled in the art.

Data passed between CATV system 500 backend components such as headend 110 and CATV system 500 front end components such as STB 145 may be passed according to the Data Over Cable Service Interface Specification (DOCSIS). DOCSIS provides for a mechanism for data transport over a cable system such as CATV 500, illustrated in FIG. 5. Among other things, DOCSIS allows for the passing of digital communications and Internet connectivity over access network 115.

Referring still to FIG. 5, headend 110 of the CATV system 500 may be positioned on the server side of CATV system 500 and may include hardware and software systems responsible for originating and managing content for distributing through access network 115 to client-side STB 145 for presentation to customers via display device 140(A). As described above, a number of services may be provided by CATV system 500, including digital and analog video programming, interactive television services, telephone services, video-on-demand services, targeted advertising, and provision of information content.

Application server 540 may comprise a general-purpose computing system operative to assemble and manage data sent to and received from client-side set-top box 145 via access network 115. As described above with reference to set-top box 145, application server 540 may comprise middleware layer 542 for processing and preparing data from headend 110 of CATV system 500 for receipt and use by client-side set-top box 145. For example, application server 540 via the middleware layer 542 may obtain data from one and/or more of a plurality of third-party services 546 via network 548 for transmitting to a customer through access network 115 and set-top box 145. For example, a weather report from a third-party weather service may be downloaded by application server 540 via network 548. When application server 540 receives the downloaded weather report, middleware layer 542 may be utilized to format the weather report for receipt and use by set-top box 145. Data obtained and managed by middleware layer 542 of application server 540 may be formatted according to the Extensible Markup Language and may be passed to set-top box 145 through access network 115 where the XML-formatted data may be utilized by client application 526 in concert with middleware layer 524, as described above. A variety of third-party services 546 data, including news data, weather data, sports data and other information content may be obtained by application server 540 via distributed computing environments such as network 548 for provision to customers via access network 115 and set-top box 145.

According to embodiments of the present invention, the application server 540 may obtain customer profile data from services provider data services 560 (which may comprise an implementation of profile server 135) for preparing a customer profile that may be utilized by the set-top box 145 for tailoring certain content provided to the customer. According to embodiments of the present invention, a customer profile may include communications applications provisioned on networked STBs, as well as, designations of individual STBs in a home, business or facility (e.g., "kitchen STB," "bedroom STB," "office STB," and the like).

A plurality of provider data services 560 may include a number of services operated by the services provider of CATV system 500 that may include data on a given customer. For example, a billing system 562 may include information such as a customer's name, street address, business identification number, Social Security number, credit history, and information regarding services and products subscribed to by the customer. An electronic mail system 564 may contain information such as electronic mail addresses, high-speed Internet access subscription information and electronic mail usage data. An authentication system 566 may include information such as secure user names and passwords utilized by customers for access to network services. A customer information database 568 may include general information about customers such as place of employment, business address, business telephone number and demographic information such as age, gender, educational level, and the like. As should be understood by those skilled in the art, the disparate data services systems 562, 564, 566, 568 are illustrated as a collection of data services for purposes of example only. The example data services systems comprising data services 560 may operate as separate data services systems, which communicate with a web services system (described below) along a number of different communication paths and according to a number of different communication protocols.

Referring still to FIG. 5, a web services system 550 is illustrated between application server 540 and data services 560. Web services system 550 may serve as a collection point for data requested from each of the disparate data services systems comprising data services 560. When application server 540 requires customer profile data from one or more of data services 560 for preparation or update of a customer profile, application server 540 passes a data query to web services system 550. Web services system 550 formulates a data query to each of the available data services systems for obtaining any available data for a given customer as identified by a set-top box identification associated with the customer. Web services system 550 may serve as an abstraction layer between the various data services systems and application server 540. That is, application server 540 is not required to communicate with the disparate data services systems, nor is application server 540 required to understand the data structures or data types utilized by the disparate data services systems. Web services system 550 may be operative to communicate with each of the disparate data services systems for obtaining necessary customer profile data. The customer profile data obtained by the web services system is assembled and is returned to application server 540 for ultimate processing via middleware layer 542, as described above.

Figure 6:
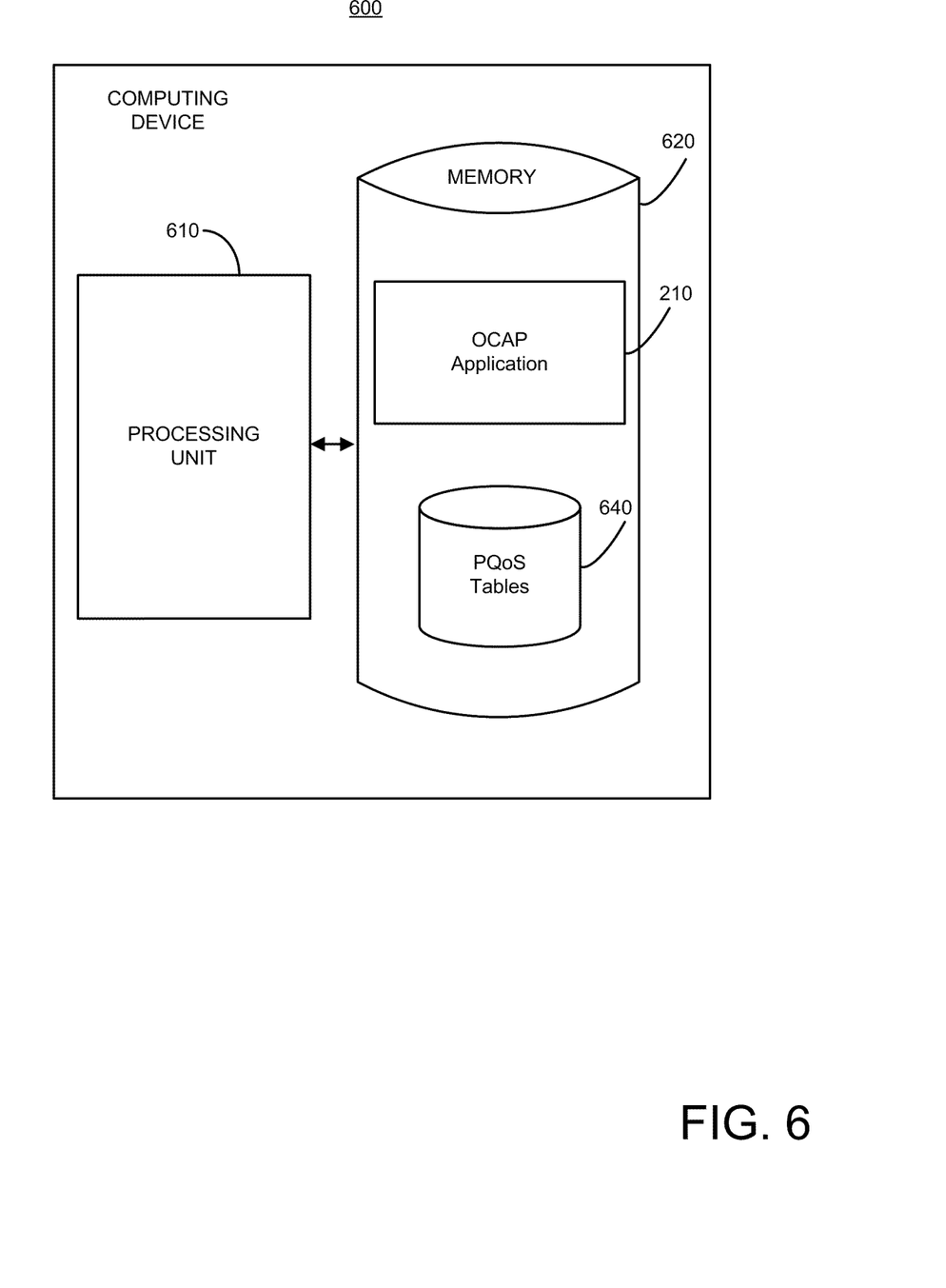
FIG. 6 is a block diagram of a computing device.

FIG. 6 illustrates a computing device 600. Computing device 600 may include a processing unit 610 and a memory unit 620. Memory 620 may include, for example, OCAP application 210 and a plurality of parameterized quality of service (PQoS) tables 640, such as device list 214, MIB table 216, and/or PQoS configuration table 218. While executing on processing unit 610, EPG generation software module 630 may perform processes for retrieving, updating, and/or transmitting billing and/or placeholder information, including, for example, one or more stages included in method 300 and/or method 400 described above with respect to FIGS. 3 and/or 4. Furthermore, OCAP application 210 may be executed on or reside in any element shown and/or described with respect to FIGS. 1 and 2. Moreover, any one or more of the stages included in method 300 and/or method 400 may be performed on any element shown in FIG. 1 and/or FIG. 2.

Computing device 600 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

An embodiment consistent with the invention may comprise a system for providing a parameterized quality of service (QoS) flow. The system may comprise a memory storage and a processing unit coupled to the memory storage. The processing unit may be operative to receive a registration request comprising a resource requirement from a device and determine whether at least one resource is available to fulfill the resource requirement. If so, the processing unit may be further operative to establish a flow priority and add the device to a priority queue configuration. Being operative to establish the flow priority may comprise being operative to identify a video quality associated with the device and assign a quality of service priority level based on the identified video quality. The processing unit may be further operative to receive a request associated with a traffic flow from the device, retrieve the established flow priority, and transmit the traffic flow at the established flow priority.

Another embodiment consistent with the invention may comprise a system for providing a parameterized quality of service flow. The system may comprise a memory storage and a processing unit coupled to the memory storage. The processing unit may be operative to receive a request to establish a traffic flow from a source device to a destination device and determine whether a priority queue configuration comprises an entry associated with the source device and the destination device. If so, the processing unit may be operative to retrieve a priority level associated with the entry and establish the traffic flow from the source device to the destination device. Otherwise, the processing unit may be operative to determine whether a network connecting the source device and the destination device comprises sufficient resources to support the traffic flow and, if so, establish the traffic flow according to at least one parameter associated with the request to establish the traffic flow. Upon receipt of a flow request not associated with an entry in the priority queue configuration, the processing unit may be further operative to create a new entry in the priority queue configuration comprising the source device, the destination device, the at least one parameter, and the priority level associated with the request to establish the traffic flow.

Yet another embodiment consistent with the invention may comprise a system for providing a parameterized quality of service flow. The system may comprise a memory storage and a processing unit coupled to the memory storage. The processing unit may be operative to receive a request to establish a traffic flow between a source device and a destination device, determine whether a traffic specification entry associated with the source device and the destination device exists in a device list table, and, if so, establish the traffic flow between the source device and the destination device according to at least one attribute associated with the traffic specification entry. If no traffic specification entry exists, the processing unit may be operative to determine a maximum video output quality associated with the destination device and create a new traffic specification entry associated with the source device and the destination device according to the maximum video output quality. Consistent with embodiments of the invention, if no traffic specification entry exists the processing unit may alternately be operative to determine whether resources are available to establish the traffic flow between the source device and the destination device for a duration associated with the request at a quality of service priority associated with the request and, if so, reserve the resources associated with establishing the traffic flow between the source device and the destination device for the duration associated with the request at the quality of service priority associated with the request.

As described herein, methods and systems are provided for providing parameterized quality of service flows. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A method for providing a parameterized quality of service (QoS) flow, the method comprising:
receiving a registration request comprising a resource requirement from a device, the registration request being associated with one or more priority levels;

determining whether an entry in a priority queue configuration is associated with the registration request;
determining whether at least one resource is available to fulfill the resource requirement based on a priority level associated with the registration request;
in response to determining that the at least one resource is available to fulfill the resource requirement:
establishing a flow priority based on the priority level associated with the registration request and the highest available priority as determined by the at least one resource available to fulfill the resource requirement, and
adding the device to the priority queue configuration;
in response to determining that the at least one resource is not available to fulfill the resource requirement:
lowering the priority level associated with the registration request and adding the device to the priority queue configuration; and
updating the parameterized QoS flow based upon a capacity change to a bandwidth for the at least one resource available to fulfill the resource requirement based on the priority level associated with the registration request.

2. The method of claim 1, wherein the device comprises at least one of the following: a computer, a portable media player, a set-top box, a television, a digital video recorder, and a cellular phone.

3. The method of claim 1, wherein the at least one resource comprises at least one of the following: the bandwidth, a nominal data rate, a peak data rate, a max burst size, a max packet size, a max delay, a max jitter/delay variation, and a max packet loss.

4. The method of claim 1, wherein establishing the flow priority comprises:
identifying a video quality associated with the device; and
assigning a quality of service priority level based on the identified video quality.

5. The method of claim 1, wherein the device comprises a Multimedia over Coax Alliance (MoCA) compliant chipset.

6. The method of claim 5, further comprising processing the registration request via an OpenCable Application Platform Application Programming Interface.

7. The method of claim 1, wherein the registration request comprises a source MAC address associated with a source device and a destination MAC address associated with a destination device.

8. The method of claim 1, wherein in response to determining that the at least one resource is not available to fulfill the resource requirement, comprising:
determining whether the at least one resource is configured for oversubscription; and
in response to determining that the at least one resource is configured for over-subscription, adding the device to the priority queue configuration.

9. The method of claim 1, further comprising:
receiving a request associated with a video flow from the device;
retrieving the established flow priority; and
transmitting the video flow at the established flow priority.

10. The method of claim 9, wherein the established flow priority is retrieved from the priority queue configuration.

11. A system for providing a parameterized quality of service (QoS) flow, the system comprising:
a memory storage; and
a processing unit coupled to the memory storage, wherein the processing unit is operative to:
receive a request to establish a traffic flow from a source device to a destination device, the request including a resource requirement, the registration request being associated with one or more priority levels,
determine whether a priority queue configuration comprises an entry associated with the source device and the destination device,
in response to determining that the priority queue configuration comprises the entry associated with the source device and the destination device, retrieve a priority level associated with the entry, establish the traffic flow from the source device to the destination device based on the priority level associated with the registration request and the highest available priority as determined by at least one resource available to fulfill the resource requirement,
in response to determining that the at least one resource is not available to fulfill the resource requirement, lower the priority level associated with the registration request and add the source device to the priority queue configuration; and
updating the parameterized QoS flow based upon a capacity change to a bandwidth for the at least one resource available to fulfill the resource requirement based on the priority level associated with the registration request.

12. The system of claim 11, wherein the processing unit is further operative to:
in response to determining that the priority queue configuration does not comprise the entry associated with the source device and the destination device, determine whether a network communicatively connected to the source device and the destination device comprises sufficient resources to support the traffic flow; and
in response to determining that the network comprises sufficient resources to support the traffic flow, establish the traffic flow according to at least one parameter associated with the request to establish the traffic flow.

13. The system of claim 12, wherein the processing unit is further operative to establish the traffic flow at the priority level associated with the request to establish the traffic flow.

14. The system of claim 13, wherein the processing unit is further operative to create a new entry in the priority queue configuration comprising the source device, the destination device, the at least one parameter, and the priority level associated with the request to establish the traffic flow.

15. The system of claim 14, wherein the new entry further comprises a source MAC address associated with the source device and a destination MAC address associated with the destination device.

16. A method for providing a parameterized quality of service flow, the method executed by the set of instructions comprising:
receiving a request to establish a traffic flow between a source device and a destination device, wherein the request comprises a resource requirement, one or more parameters, one or more priority levels, a source MAC address associated with the source device and a destination MAC address associated with the destination device, wherein the one or more parameters include information relating to one or more of a nominal data rate, a peak data rate, a max burst size, a max packet size, a max delay, a max jitter/delay variation, and a max packet loss;
determining whether a traffic specification entry associated with the source device and the destination device exists in a device list table, wherein the device list table comprises an index associated with at least one of the following: the source MAC address and the destination MAC address;

in response to determining that the traffic specification entry associated with the source device and the destination device exists in the device list table, establishing the traffic flow between the source device and the destination device according to at least one attribute associated with the traffic specification entry and based on a priority level associated with the registration request and the highest available priority as determined by the at least one resource available to fulfill the resource requirement;

in response to determining that the at least one resource is not available to fulfill the resource requirement, lowering the priority level associated with the registration request and adding the source device to a priority queue configuration; and updating the traffic flow based upon a capacity change to a bandwidth for the at least one resource available to fulfill the resource requirement based on the priority level associated with the registration request.

17. The method of claim 16, further comprising:

in response to determining that the traffic specification entry associated with the source device and the destination device does not exist in the device list table:

determining a maximum video output quality associated with the destination device; and creating a new traffic specification entry associated with the source device and the destination device according to the maximum video output quality.

18. The method of claim 16, further comprising:

in response to determining that the traffic specification entry associated with the source device and the destination device does not exist in the device list table:

determining whether resources are available to establish the traffic flow between the source device and the destination device for a duration associated with the request at a quality of service priority associated with the request; and in response to determining that resources are available to establish the traffic flow between the source device and the destination device for the duration associated with the request at the quality of service priority associated with the request, reserving the resources associated with establishing the traffic flow between the source device and the destination device for the duration associated with the request at the quality of service priority associated with the request.

19. The method of claim 18, further comprising:

in response to determining that resources are not available to establish the traffic flow between the source device and the destination device for the duration associated with the request at the quality of service priority associated with the request, establishing the traffic flow between the source device and the destination device for the duration associated with the request at a lower quality of service priority than the quality of service priority associated with the request.

20. The method of claim 16, wherein the at least one resource comprises at least one of the following: the bandwidth, a nominal data rate, a peak data rate, a max burst size, a max packet size, a max delay, a max jitter/delay variation, and a max packet loss.

* * * * *